M. L. CURRY.
CULINARY IMPLEMENT.
APPLICATION FILED DEC. 13, 1916.
1,246,242.
Patented Nov. 13, 1917.
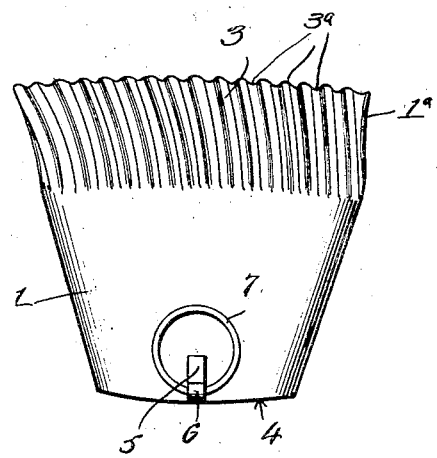
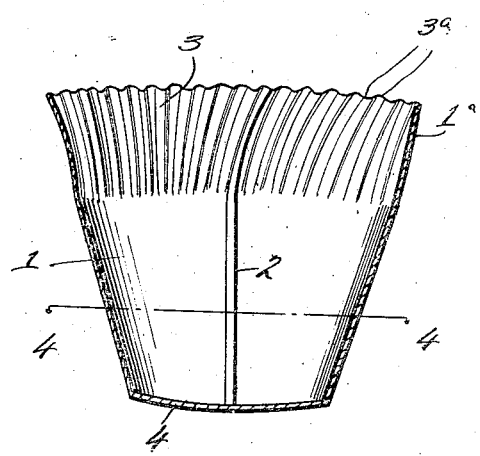
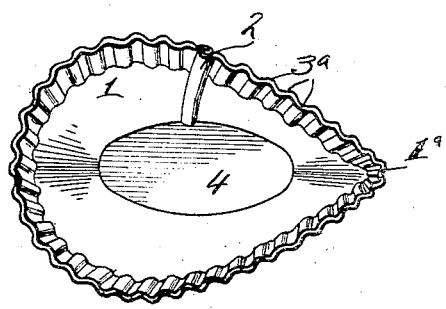
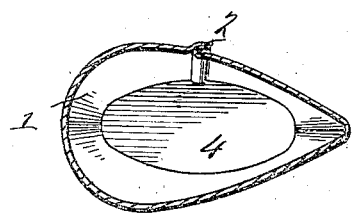
WITNESSES
INVENTOR
Muriel L. Curry
BY
ATTORNEY

UNITED STATES PATENT OFFICE.

MURIEL L. CURRY, OF MIAMI, FLORIDA.

CULINARY IMPLEMENT.

1,246,242.  Specification of Letters Patent.  Patented Nov. 13, 1917.

Application filed December 13, 1916. Serial No. 136,724.

*To all whom it may concern:*

Be it known that I, MURIEL L. CURRY, a citizen of the United States, residing at Miami, in the county of Dade and State of Florida, have invented certain new and useful Improvements in Culinary Implements, of which the following is a specification.

This invention relates to culinary implements, and more particularly to a device for scraping and cleaning pots and the like.

One of the main objects of the invention is to provide a device of the character stated of simple construction and operation which may be produced at relatively small cost and is so formed as to readily remove burnt matter and similar deposits from cooking utensils having an edge so shaped as to provide a plurality of alternately and oppositely disposed cutting members which will engage the material to be removed from the surface of the pot at an angle so as to readily cut or scrape the same from the surface to be cleaned. A further object is to provide a cleaner so shaped as to be readily insertible into all angles or corners of a pot so as to remove any deposits which may accumulate at these points. Further objects will appear from the detailed description.

In the drawings:—

Figure 1 is a side view of the cleaner,

Fig. 2 is a central vertical sectional view,

Fig. 3 is a top plan view,

Fig. 4 is a section on line 4—4 of Fig. 2.

The body 1 of the cleaner is of substantially ovoidal shape in horizontal cross section and tapers downwardly. This body is made from a continuous piece of sheet metal the ends of which are secured by a lap or seam joint 2. The upper portion of the body 1 is crimped or corrugated longitudinally as at 3. This crimping produces a plurality of contiguous alternately and oppositely directed cutting members or teeth $3^a$. In using the cleaner the smooth part of the body 1 is held in the hand, the top or opening being moved over the inner surface of the body to be cleaned, and held tightly in contact therewith. The teeth $3^a$ engage the material on the inner face of the body so as to cut or scrape the same away from the surface to be cleaned, this material falling to the bottom of the pot or collecting within the body 1. The point or apex $1^a$ of body 1 is well adapted to be inserted into any corners or angles of the pot so as to remove material which is not readily accessible.

For convenience in holding the cleaner, the body 1 is provided with a convexed bottom or plate 4 formed integral therewith, or which may be formed separate from the body and secured therein by soldering or in any other suitable manner. This plate is so shaped as to fit readily into a person's palm, the tapered portion of the body 1 being grasped by the fingers, thus rendering it possible to secure a firm hold on the cleaner and eliminating all danger of injury to the hand of the user due to sharp edges or projections.

A strap 5 is secured to the body 1, at the center of one side thereof, and is bent to form an eye 6. A ring 7 is secured through this eye, thus providing means whereby the implement may be hung from a suitable hook or the like when not in use. When using the cleaner the ring 7 folds down flat against the body 1 so as not to interfere in any way with the proper manipulation of the implement.

What I claim is:

A culinary implement having a substantially frusto-conical shaped body formed from a continuous piece of sheet metal, the said body having its edge portion at its broader end crimped to provide a plurality of contiguous alternately and oppositely directed cutting members, and a convex bottom plate secured in said body, the said bottom plate and body serving to provide means whereby the implement may be readily grasped by the user, the body being of ovoidal shape in cross section and of uniformly tapering width from its base to its apex whereby ready entry of the point of the body into corners of a pan for removing foreign material is permitted.

In testimony whereof I affix my signature in presence of two witnesses.

MURIEL L. CURRY.

Witnesses:
 GEO. C. BOLLES,
 BESSIE WILLIAMSON.